United States Patent
Pohludka

(10) Patent No.: US 10,709,162 B2
(45) Date of Patent: Jul. 14, 2020

(54) EDIBLE COMPOSITION

(71) Applicant: MARS, INCORPORATED, McLean, VA (US)

(72) Inventor: Daniel Pohludka, Porici nad Sazavou (CZ)

(73) Assignee: Mars, Incorporated, McLean, VA (US)

(*) Notice: Subject to any disclaimer, the term of this patent is extended or adjusted under 35 U.S.C. 154(b) by 52 days.

(21) Appl. No.: 15/984,797

(22) Filed: May 21, 2018

(65) Prior Publication Data

US 2018/0263275 A1 Sep. 20, 2018

Related U.S. Application Data

(63) Continuation of application No. 14/685,975, filed on Apr. 14, 2015, now Pat. No. 9,974,328, which is a (Continued)

(30) Foreign Application Priority Data

Apr. 24, 2009 (EP) ..................... 09251171

(51) Int. Cl.
*A23P 20/10* (2016.01)
*A23P 20/18* (2016.01)
(Continued)

(52) U.S. Cl.
CPC ............... *A23P 20/18* (2016.08); *A23G 1/54* (2013.01); *A23G 3/0065* (2013.01); *A23G 3/343* (2013.01);
(Continued)

(58) Field of Classification Search
CPC .......... A23G 1/54; A23G 3/0065; A23G 3/54; A23G 3/343; A23P 20/105
See application file for complete search history.

(56) References Cited

U.S. PATENT DOCUMENTS 3,272,176 A 9/1966 Bernard
4,041,188 A 8/1977 Cottier
(Continued)

FOREIGN PATENT DOCUMENTS

EP 0547551 A1 * 6/1993 ............. A21D 15/08
GB 1204721 * 9/1970
(Continued)

OTHER PUBLICATIONS

Mali et al "Effects of controlled storage on thermal, mechanical and barrier properties of plasticized films from different starch sources" Journal of Food Engineering 75 (2006) pp. 453-460 (Year: 2006).*
(Continued)

*Primary Examiner* — Kelly J Bekker
(74) *Attorney, Agent, or Firm* — Fish & Richardson P.C.

(57) ABSTRACT

A method of preparing a composite foodstuff is provided and comprises providing a core, providing a barrier composition and applying the barrier composition to at least a portion of the core and providing a fat based coating having a lower fat content than the core. The fat based coating is applied to the barrier coated cores. The hardness of the fat based coating does not decrease over a period of storage.

19 Claims, 2 Drawing Sheets

Related U.S. Application Data continuation of application No. 13/265,999, filed as application No. PCT/IB2010/001045 on Apr. 26, 2010, now abandoned.

(51) Int. Cl.

| | | |
|---|---|---|
| *A23G 1/54* | (2006.01) | |
| *A23G 3/34* | (2006.01) | |
| *A23G 3/54* | (2006.01) | |
| *A23P 20/12* | (2016.01) | |
| *A23P 20/15* | (2016.01) | |
| *A23G 1/00* | (2006.01) | |

(52) U.S. Cl.
CPC ............ *A23G 3/54* (2013.01); *A23P 20/105* (2016.08); *A23P 20/11* (2016.08); *A23P 20/12* (2016.08); *A23P 20/15* (2016.08); *A23G 1/0079* (2013.01)

(56) References Cited

U.S. PATENT DOCUMENTS

| | | | |
|---|---|---|---|
| 4,446,166 A | 5/1984 | Giddey | |
| 4,923,708 A | 5/1990 | Given | |
| 5,023,099 A | 6/1991 | Boehm | |
| 5,023,102 A | 6/1991 | Given | |
| 5,080,920 A | 1/1992 | Taylor | |
| 5,324,533 A | 6/1994 | Cain | |
| 5,354,567 A | 10/1994 | Huang | |
| 5,385,744 A | 1/1995 | Cain | |
| 5,431,948 A | 7/1995 | Cain | |
| 5,554,408 A | 9/1996 | Cain | |
| 5,571,546 A | 11/1996 | Kristinus | |
| 5,576,045 A | 11/1996 | Cain | |
| 5,585,135 A | 12/1996 | Patterson | |
| 5,607,716 A | 3/1997 | Doherty | |
| 5,849,353 A | 12/1998 | Baker | |
| 6,210,739 B1 | 4/2001 | Nalur | |
| 6,340,473 B1 | 1/2002 | Tanner | |
| 6,676,982 B2 | 1/2004 | Mody | |
| 6,773,744 B1 | 8/2004 | Ward | |
| 6,846,502 B1 | 1/2005 | Billmers | |
| 6,932,995 B2 | 8/2005 | Schevers | |
| 7,022,362 B2 | 4/2006 | Rabinovitch | |
| 7,229,657 B2 | 6/2007 | Woelfel | |
| 7,854,994 B2 | 12/2010 | Henderson-Rutgers | |
| 8,617,635 B2 | 12/2013 | Hanselmann | |
| 2002/0034549 A1* | 3/2002 | Becker | A23G 3/343 424/489 |
| 2002/0098267 A1 | 7/2002 | Heisey | |
| 2003/0170355 A1 | 9/2003 | Glazier | |
| 2005/0084603 A1 | 4/2005 | Kaiser | |
| 2006/0110493 A1 | 5/2006 | Schnieber | |
| 2007/0092607 A1 | 4/2007 | Johnston | |
| 2007/0141198 A1* | 6/2007 | Yang | A23G 3/54 426/3 |

FOREIGN PATENT DOCUMENTS

| | | |
|---|---|---|
| GB | 1417797 | 12/1975 |
| GB | 2363049 | 12/2001 |
| WO | WO 2001091721 | 12/2001 |
| WO | WO 2001092400 | 12/2001 |
| WO | WO 2003088756 | 10/2003 |
| WO | WO 2006042364 | 4/2006 |

OTHER PUBLICATIONS

USDA "Full Report 45279386 Almonds Roasted" p. 1 printed Sep. 2019 https://ndb.nal.usda.gov/ndb/foods/show/45279386?fgcd=&manu=&format=&count=&max=25&offset=&sort=default&order=asc&qlookup=ROASTED+ALMOND (Year: 2019).*
Lees et al Sugar Confectionery & Chocolate Manufacture Lees & Jackson 1973 p. 124 (Year: 1973).*
Fatsecret Cookies, printed Mar. 29, 2017, URL <http://www.fatsecret.com/calories-nutrition/search?q=cookie> pp. 1-4.
KingArthur, "Ingredient Weight Chart," printed Mar. 29, 2017, URL <http://www.kingarthurflour.com/learn/ingredient-weight-chart.html>, pp. 1-7.
Minifie Chocolate, Cocoa, and Confectionery 3rd Ed. Chpman and Hall, 1989, pp. 541-543.
Minifie, Chocolate, Cocoa, and Confectionery, 3rd Ed., 1999, p. 506.
Silva, et al., "Cassava starch-based films plasticized with sucrose and inverted sugar and reinforced with cellulose nanocrystals," J. Food Sci., 2012, 77(6):1-2.
SparkPeople Calories in Cheese Powder, printed Mar. 27, 2017, URL <http://www.sparkpeople.com/calories-in.asp?food=cheese+powder>, pp. 1-2.

* cited by examiner

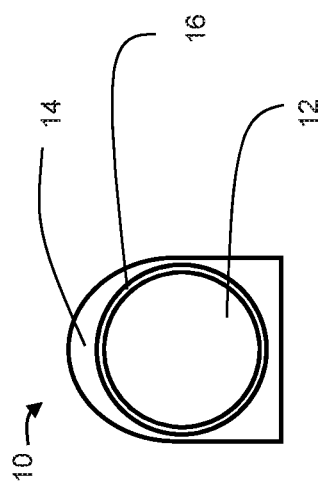
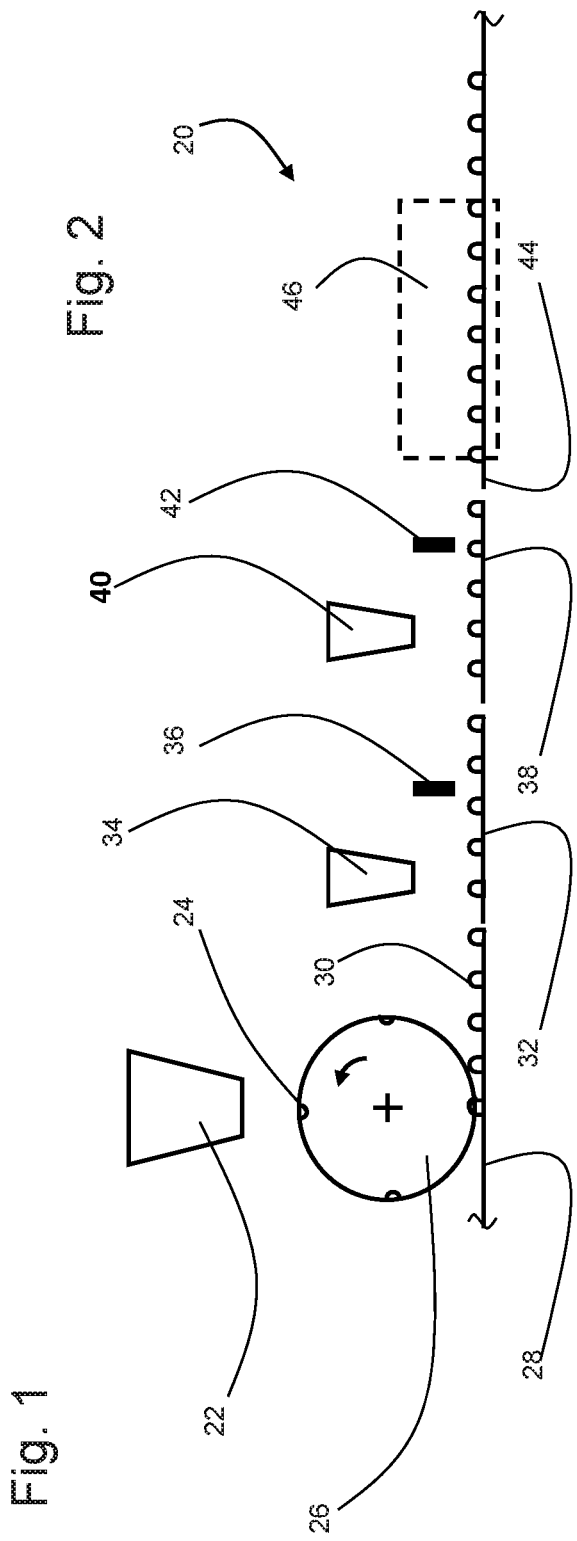

EDIBLE COMPOSITION

CROSS REFERENCE TO RELATED APPLICATIONS

This is a continuation of U.S. application Ser. No. 13/265,999, filed Oct. 24, 2011 (pending), which, in turn, is 371 application of PCT International Patent Application Number PCT/IB2010/001045, filed Apr. 26, 2010, which claims priority to European patent application number 09251171.6, filed Apr. 24, 2009. Each of these applications is incorporated herein by reference in their entirety for any and all purposes.

The present invention relates to an edible composition, particularly to an edible composition useful as a barrier to the migration of a foodstuff component, such as a fat.

In composite foodstuffs, such as composite confectionery items, it may be desirable to prevent the migration of a component of one element into the other element. For example, in the case of a confectionery item comprising a core with a relatively high soft fat content, such as a praline core, and a coating such as chocolate, it may be desired to prevent migration of fat from the core into the coating. In the case of a chocolate coating, migration of fat into the chocolate coating can lead to the formation of a fat bloom on the surface of the coating; although the bloom is harmless, it is aesthetically undesirable. Fat migration may also adversely affect the texture of a confectionery product; for example, chocolate into which fat migrates may soften.

It has been proposed, for example in EP-A-0 547 551, to provide a barrier against moisture migration in the form of a film of starch. Although such a film may be effective as a barrier, it is a solid layer within the foodstuff and is detectable during consumption of the foodstuff, with a deleterious effect on the taste and texture properties of the foodstuff.

It has been desired, therefore, to provide a barrier composition for use in foodstuffs which has little or no effect upon the organoleptic properties of the foodstuff and is effective to prevent migration of a component from one element of the foodstuff to another.

According to the invention there is provided a barrier composition for use in foodstuffs comprising from 1% to 40% by weight of starch having a degree of polymerisation of no more than 90 and from 40% to 90% by weight of a plasticizer for the starch, the ratio of starch to plasticizer being no more than 1:1.5.

The type of starch employed is not believed to be of particular importance; for example, the amylase/amylopectin ratio of the starch is not believed to be important. It is preferred that the degree of polymerisation (DP) of the starch is no lower than 5, more preferably no lower than 10, but starches having lower DP values may be used. The starch may be a modified starch.

A preferred plasticizer is glycerol. Other preferred plasticizers include dihydric alcohols, such as ethylene glycol and propylene glycol. Preferably, the starch to plasticizer ratio is no more than 1:3, preferably no more than 1:4, more preferably no more than 1:6, still more preferably no more than 1:8. Preferably, the ratio is no less than 1:20, more preferably no less than 1:12, more preferably no less than 1:10.

The barrier composition preferably includes up to 40% by weight of a bulking agent, which may impart a desired flavour to the composition. A preferred bulking agent is fructose. Other preferred bulking agents include other mono- and di-saccharides. Other edible components which do not significantly affect the viscosity of the composition may be used as bulking agents.

The barrier composition may include up to 10% by weight of water. The water content affects the viscosity of the barrier composition and can be used to control it.

The barrier compositions of the invention are liquid at the point at which they are applied to the foodstuff, so that conventional confectionery manufacturing techniques such as enrobing or the so-called triple shot deposition technique can be used to apply them. Preferably, the viscosity of the barrier compositions of the invention at the point of application is from 5 Pa's to 600 Pa's, preferably from 100 Pa's to 400 Pa's. Viscosity measurements are made on an Advanced Rheometer AR100 parallel plate rheometer at a constant shear rate of 1000 Pa, using a 40 mm flat (0") steel probe and a gap of 1 mm, at 25° C.

The invention also provides a composite foodstuff comprising first and second foodstuff elements having different fat compositions and/or contents from each other and a barrier composition according to the invention between them. The elements may contain different fats, different amounts of fat or both. Preferably, the first element is a core and the second foodstuff element is a coating around the core; more preferably, the core has a higher liquid fat content than the coating.

Preferably, the first element is a soft fat based core, such as a confectionery cream (not necessarily a dairy cream). A typical confectionery cream has a composition as follows:

at least 25% soft fat comprising at least 20% liquid fat at 20° C. (that is, a higher proportion and a softer fat than cocoa butter in chocolate);

an emulsifier such as lecithin or PGPR; and other bulking ingredients such as sugar or other mono- and di-saccharides, polyols, skimmed milk powder or other food ingredients.

Preferably, the second foodstuff element is a fat based coating such as a coating of chocolate, a chocolate compound (a chocolate flavour material not conforming to the usual definition of chocolate, usually containing less cocoa butter than chocolate or no cocoa butter) or a chocolate equivalent (a material containing little or no chocolate but with similar flavour and texture). In a particularly preferred foodstuff, the coating is chocolate.

The invention also provides a method of making a barrier composition according to the invention comprising dissolving the starch in the plasticizer and heating the solution, preferably at between 120° C. and 160° C. If water is to be added, it is added with the plasticizer. The bulking agent is preferably added after the starch has dissolved.

The invention will be further described by way of example, with reference to the drawings in which:

FIG. 1 shows a cross section through a confectionery product according to the invention;

FIG. 2 shows schematically a first apparatus for making the confectionery product of FIG. 1.

Figure 3:
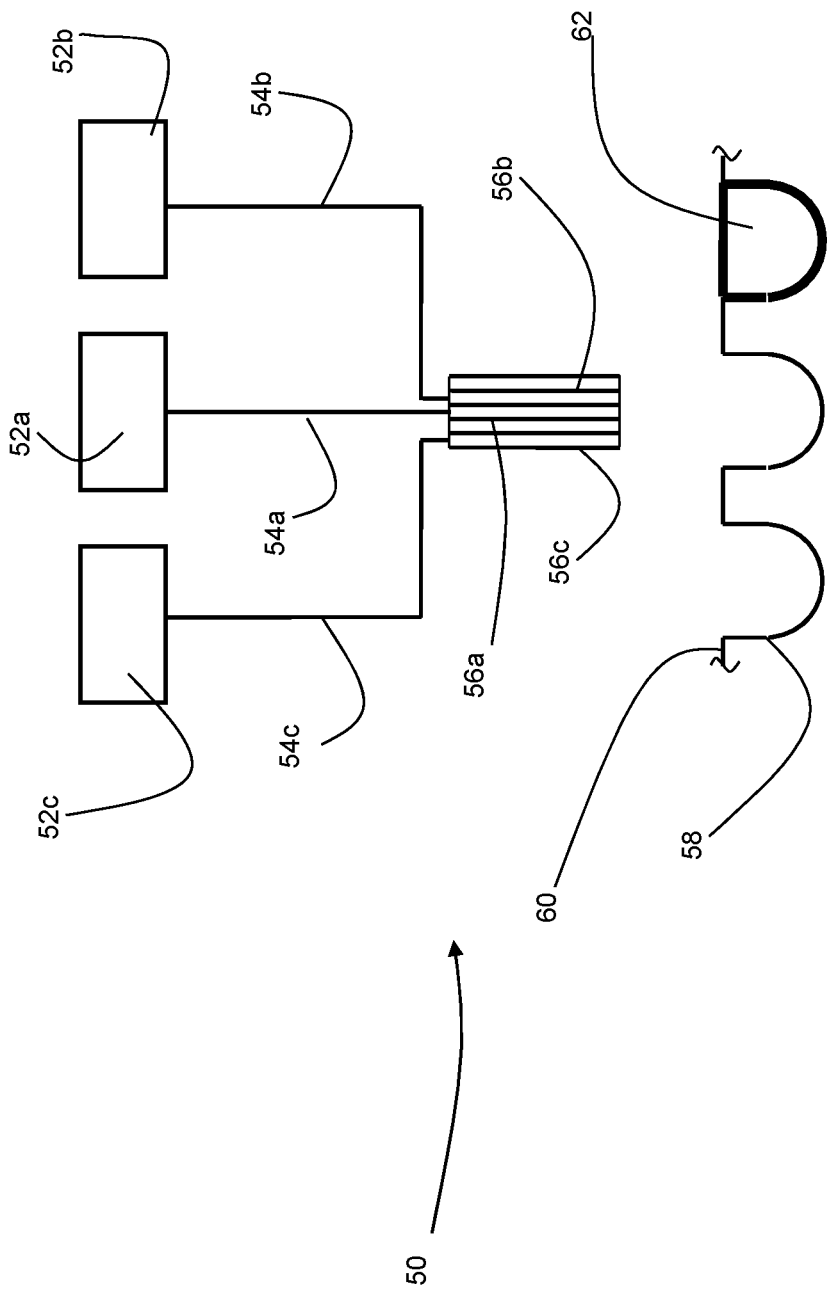
FIG. 3 shows schematically a second apparatus for making the confectionery product of FIG. 1.

The invention will be described in part with reference to the manufacture of a chocolate coated praline having a soft fat based core. It will be readily appreciated that the invention finds application in other foodstuffs where a barrier to liquid fat is required, particularly a barrier to liquid fat migration from a high liquid fat content element of the foodstuff.

A chocolate coated praline 10 according to the invention, shown in FIG. 1, comprises a praline core 12 as the first element and a chocolate coating 14 as the second element.

Since the liquid fat content of the praline core is higher than that of the chocolate coating, in a conventional chocolate coated praline fat would migrate from the core to the coating, leading to the formation of an undesirable fat bloom on the surface of the coating and softening of the coating. In the chocolate coated praline of the invention, a layer 16 of the barrier composition of the invention is disposed between the praline core 12 and the chocolate coating 14. The barrier layer 16 prevents migration of fat from the core 12 to the chocolate coating 14, so that the chocolate coated praline 10 may be stored without the formation of bloom on the coating.

Barrier compositions according to the invention may be made as follows:

The starch component is dissolved in the plasticizer by heating them together at from 120° C. to 160° C. in a in a jacketed vessel with a low shear propeller mixer until the solution clears (this typically takes up to 10 minutes depending on the quantities and the vessel used). The water content, if any, is reduced by this heating. Any bulking agent employed is added to the heated solution. The solution is then cooled to ambient temperature. Low shear mixing is preferred to high shear mixing to avoid reducing the degree of polymerisation of the starch.

Table 1 shows exemplary barrier compositions according to the invention. In the table:

HRS is thinned hydroxypropylated starch;
GLY is glycerol;
SUC is sucrose;
FRU is fructose.
CRY is Crystal-Tex626 (trade mark), a tapioca dextrine product supplied by National Starch & Chemical; and
GLU13 is Glucidex12 (trade mark), a maize maltodextrine product supplied by Roquette Freres having a DE (dextrose equivalency) of 12, corresponding to a DP (degree of polymerisation) of about 16.

TABLE 1

| Recipe (dry material ratio) | Starch:plasticiser ratio (dry material) | Water content prior to cooking/% in raw material | added | Viscosity after cooking $\eta_{25°C.}/$ mPa · s |
|---|---|---|---|---|
| HPS:GLY = 25:75 | 1:3 | 4.3 | 0 | 332300 |
| HPS:GLY = 20:80 | 1:4 | 3.7 | 0 | 111000 |
| HPS:GLY = 10:90 | 1:9 | 2.3 | 0 | 7489 |
| HPS:GLY:SUC = 19:76:5 | 1:4 | 3.48 | 0 | 117200 |
| HPS:GLY:SUC = 10:60:30 | 1:6 | 2.59 | 0 | 161700 |
| HPS:GLY:SUC = 8:52:40 | 1:6.5 | 1.69 | 0 | 124300 |
| HPS:GLY:FRU = 18:52:30 | 1:2.9 | 5.5 | 0 | 150300 |
| HPS:GLY:FRU = 12:58:30 | 1:4.8 | 3.63 | 0 | 63400 |
| HPS:GLY:FRU = 12:58:30 | 1:4.8 | 3.63 | 3.34 | 4699 |
| HPS:GLY:FRU = 9:51:40 | 1:5.7 | 4.01 | 0 | 45000 |
| CRY:GLY = 20:80 | 1:4 | 1.83 | 0 | 9649 |
| CRY:GLY = 40:60 | 1:1.5 | 2.64 | 0 | 381000 |
| GLU:GLY = 20:80 | 1:4 | 1.41 | 0 | 8689 |
| GLU:GLY = 40:60 | 1:1.5 | 1.81 | 0 | 362700 |

The barrier compositions of the invention are relatively viscous liquids when prepared. They can be applied to a foodstuff element by any method used in the preparation of foodstuffs to coat such a liquid into a substrate. Preferred methods include enrobing and the triple shot deposition method.

The application of barrier compositions according to the invention will be further described, by way of example, with reference to the preparation of chocolate coated pralines; generally spherical cores of praline with a thin chocolate coating, of the type shown in FIG. 1. It will be appreciated that the barrier compositions can be applied to other foodstuff elements and by other application techniques.

Example 1; Enrobing

Praline cores are prepared by mixing 27.5% by weight icing sugar and 22.5% by weight skimmed milk powder in a Hobart mixer. To this mixture, 24.8% by weight of molten soft fat at 30° C. is slowly added with mixing to form a dry paste. The dry, crumbly paste is refined in a roller refiner until the particle size is reduced to no more than about 14 μm. A further 24.7% by weight of the molten fat is added to the paste, with mixing to produce an homogenous liquid paste. The paste is refrigerated until use.

The outer coating used in the preparation of the coated pralines is conventional milk chocolate made having the following composition:

| | |
|---|---|
| sucrose | 54% |
| cocoa butter | 22.7% |
| whole milk powder | 13% |
| cocoa liquor | 10% |
| lecithin | 0.25% |
| vanillin | 0.05% |

The chocolate is refined to a particle size below 14 μm.

A barrier composition for use in the preparation of the coated pralines by an enrobing technique is made by adding 11.3% by weight thinned hydroxypropylated starch (C*AraSet 75701 (trade mark), supplied by Cargill plc) is added to 59.3% by weight of glycerol and heated to 150° C. to dissolve the starch. 29.4% by weight fructose is added to the solution, which is then cooled to 30° C. The barrier composition has a viscosity of 145 Pa·s at 25° C. measured as described above.

To the praline made as described above is added 5% by weight sunflower oil and 10% by weight wafer inclusions, based on the weight of praline, before use to make coated pralines.

Coated pralines according to the invention may be made on an enrobing apparatus 20 of the type shown schematically in FIG. 2. Cores of the praline are formed by introducing the praline paste from a paste hopper 22 sequentially into a plurality of moulds 24 (of which four exemplary moulds are shown in FIG. 2) in the surface of a mould drum 26 rotating in the direction shown by the arrow in FIG. 2. The core paste is introduced into a mould 24 when the mould is at its highest point; the filled mould is carried by the drum to its lowest point, at which point the moulded core is released onto a continuous belt 28 (the upper run only of which is shown in FIG. 2). The cores 30 are conveyed on the belt 28 onto a first continuous mesh belt 32 (the upper run only of which is shown in FIG. 2) which conveys the cores through a curtain of the barrier composition, at about 30° C. to about 50° C., released from a barrier hopper 34 above the mesh belt 32 to coat the core with the barrier composition. The drum 26 is cooled so that the surfaces of the cores 30 are at about −10° C. as they pass through the curtain of barrier composition. The thickness of the barrier composition coating is brought down to about 0.5 mm in any suitable way, such as by application of an air knife 36 operating at up to about 5 bar. At this stage, the temperature of the barrier coated cores is about −5° C. and the barrier composition is sufficiently solidified on the cores to allow the barrier coated cores to be transferred to the next stage of the manufacturing process while maintaining an even, continuous barrier coating.

The barrier coated cores are then carried by the first mesh belt 32 to a second continuous mesh belt 38 (the upper run only of which is shown in FIG. 2) which conveys them through a curtain of the liquid tempered milk chocolate, at about 28° C., released from a chocolate hopper 40 to provide an outer coating of chocolate. The thickness of the chocolate coating is brought down to about 6 mm by application of an air blower 42, operating at up to 2 bar. The surfaces of the coated pralines are at about 15° C. at this stage. They are carried by the second mesh belt 38 to another continuous belt 44 (the upper run only of which is shown in FIG. 2) into a refrigeration zone 46 where their temperature drops to about 10° C., after which they are removed from the belt for packaging and storage. The process is conducted so that the ratio of core to chocolate in the finished coated product is about 3:2.

After storage for 32 weeks at 20° C., there was no apparent fat blown on the surface of the coated pralines and the chocolate coating had not softened. The wafer inclusions remained crisp.

Example 2; Triple Shot Deposition

A barrier composition is made by adding 12.8% by weight of thinned hydroxypropylated starch (C*Araset 75701 (trade mark), supplied by Cargill plc) to a solution of 54.5% by weight of glycerol in 4.8% by weight of water and heating the mixture to 150° C. to dissolve the starch in the glycerol solution. 27.9% by weight of fructose is added, and the mixture cooled to 30° C.

Coated pralines were made using a Winkler & Dünnebier Süßwarenmaschinen GmbH WDS 163.02 depositor. A triple shot depositor 50 is shown schematically in FIG. 3. The praline, barrier composition and liquid tempered chocolate are supplied to three separate hoppers 52*a, b, c* respectively. The praline and the chocolate coating have the same compositions as those of Example 1. The praline, barrier composition and liquid tempered chocolate are led from the hoppers through respective pipes 54*a, b, c* to, respectively, the inner 56*a*, middle 56*b* and outer 56*c* of three concentric deposition nozzles in the machine, and deposited into moulds 58 passing continuously on a belt 60 under the nozzles 56*a, b, c* to form coated pralines having a praline core, a barrier coating and an outer chocolate coating. The flow of each component is interrupted and timed so that the praline core is coated by the barrier composition and the barrier composition is coated by the chocolate as the materials enter a mould 58 to form coated pralines 62. The moulds may be cooled to accelerate setting of the chocolate coating. The coated pralines are removed from the moulds for packaging and storage.

In this example, the temperatures of the materials in the hoppers 52*a, b, c* and in the nozzles 56*a, b, c* were held between 27° C. and 31° C. The flow to the nozzles was adjusted to produce chocolate coated pralines consisting of 33% by weight praline, 50% by weight of chocolate and 17% by weight of barrier composition.

Performance of the chocolate coated pralines according to the invention made by the triple shot deposition process was compared with that of reference chocolate coated pralines of similar composition but without the barrier layer; the ratio of core to chocolate coating was the same in both samples The hardness of the chocolate coating of the pralines of the invention increased continuously over the 32 weeks (at 18° C. over which they were studied, whereas the hardness of the chocolate coating of the reference pralines decreased markedly over the first three weeks and then remained stable. This indicates that fat has migrated from the core of the reference pralines into the chocolate coating, softening it, and that this has not occurred in the coated pralines of the invention.

The hardness of the chocolate coating was determined as follows:

The product, stored at 18° C., is placed in a cabinet at 20° C. at least 2 hours prior to measurement to temper. Texture analyser (Stable Microsystems Ltd TA2XTi) with a 45° steel cone was used to measure chocolate shell hardness. The probe test speed was set to 1 mm/s. The force at 1 mm penetration of the probe into the chocolate coating was recorded.

The results were as follows:

| Time/weeks | Invention/N | Reference/N |
| --- | --- | --- |
| 3 | 0.43 | 0.27 |
| 6 | 0.46 | 0.27 |
| 15 | 0.53 | 0.26 |
| 32 | 0.62 | 0.25 |

It is apparent from the results that the chocolate coating of the reference pralines decreased slightly over the 32 week storage period, as would be expected because of the effect of liquid fat migrating into the coating from the core. It is also seen that the chocolate coating of pralines of the invention hardened over the same period, indicating that no fat migrated from the core into the coating.

It was also noted that the stability of the chocolate coating of the coated pralines of the invention is superior to that of the reference pralines. Heat stability comparisons were made at 15 and 32 weeks after manufacture. The pralines according to the invention were stable at 35° C., whereas the reference pralines collapsed at this temperature.

It will be seen that the invention provides a barrier composition for foodstuffs which has little or no effect upon the organoleptic properties of the foodstuff and is effective to prevent migration of a component from one element of the foodstuff to another, and foodstuffs incorporating such a barrier composition, and a method for making such a barrier composition.

The invention claimed is:

1. A composite foodstuff prepared by a process comprising the steps: providing a core;
   preparing a liquid barrier composition consisting of starch, a plasticizer, up to 40% of a bulking agent and up to 10% water and applying the liquid barrier composition to at least a portion of the core to provide one or more barrier coated cores; and
   providing a liquid coating comprising fat and applying the liquid coating to at least that portion of the barrier coated cores comprising the barrier composition to provide the composite foodstuffs, the percentage of the fat in the coating by weight of the coating being lower than the percentage of the fat in the core by weight of the core;
   wherein the ratio of said starch to said plasticizer is no more than 1:1.5, the bulking agent is mono-saccharides, disaccharides, or combinations thereof, and the temperature of the liquid barrier composition at the time of application to the cores is from about 30° C. to about 50° C.

2. The composite foodstuffs of claim 1, wherein the core is provided by adding a fat, in a molten state, to one or more bulking ingredients while mixing.

3. The composite foodstuffs of claim 2, wherein the bulking ingredients comprise mono- or di-saccharides, polyols, milk powder, or a combination of any number of these.

4. The composite foodstuffs of claim 2, wherein the core comprises at least 25 wt % fat; at least 20% of the fat being liquid at 20° C.

5. The composite foodstuffs of claim 4, wherein the core fat is added in at least two additions and the two additions are separated by a refining step.

6. The composite foodstuffs of claim 2, wherein the core is chilled after mixing.

7. The composite foodstuffs of claim 1, wherein the barrier composition is provided by dissolving the starch in the plasticizer and heating the dissolved starch to a temperature of from 120° C. to 160° C.

8. The composite foodstuffs of claim 7, further comprising adding the bulking agent after the starch is dissolved in the plasticizer.

9. The composite foodstuffs of claim 7, further comprising adding the water to the plasticizer, before, during or after dissolution of the starch therein.

10. The composite foodstuffs of claim 1, wherein the core is coated with the barrier composition using an enrobing technique.

11. The composite foodstuffs of claim 10, wherein the barrier coated cores are chilled to a temperature sufficient to substantially solidify the barrier composition.

12. The composite foodstuffs of claim 11, wherein the barrier coated cores are chilled to a temperature of about −5° C.

13. The composite foodstuffs of claim 10, wherein the thickness of barrier composition on the cores is adjusted by an air knife.

14. The composite foodstuffs of claim 13, wherein the adjusted thickness of the barrier composition on the core is about 5 mm.

15. The composite foodstuffs of claim 1, wherein the barrier coated core is enrobed with the fat based coating.

16. The composite foodstuffs of claim 15, further comprising chilling the composite foodstuff to a temperature of about 10° C.

17. The composite foodstuffs of claim 1, wherein after a storage period of 32 weeks at 20° C. there is no apparent fat bloom on a surface of the composite foodstuff and/or the hardness of the coating does not decrease.

18. The composite foodstuffs of claim 1, wherein the plasticizer is glycerol, ethylene glycol, propylene glycol, or a combination of these.

19. The composite foodstuffs of claim 1, wherein the liquid barrier composition does not comprise added water.

* * * * *